United States Patent
Chen et al.

(10) Patent No.: US 12,273,053 B2
(45) Date of Patent: Apr. 8, 2025

(54) MOTOR AND ELECTRONIC DEVICE

(71) Applicant: VIVO MOBILE COMMUNICATION CO., LTD., Guangdong (CN)

(72) Inventors: Xu Chen, Guangdong (CN); Cheng Cai, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 253 days.

(21) Appl. No.: 18/071,827

(22) Filed: Nov. 30, 2022

(65) Prior Publication Data
US 2023/0163701 A1 May 25, 2023

Related U.S. Application Data

(63) Continuation of application No. PCT/CN2021/097904, filed on Jun. 2, 2021.

(30) Foreign Application Priority Data

Jun. 4, 2020 (CN) .......................... 202010499960.2

(51) Int. Cl.
*H02N 2/00* (2006.01)
*B06B 1/02* (2006.01)
*H02K 1/34* (2006.01)

(52) U.S. Cl.
CPC .............. *H02N 2/001* (2013.01); *H02K 1/34* (2013.01); *H02N 2/005* (2013.01); *H02N 2/0075* (2013.01)

(58) Field of Classification Search
CPC ................ H02N 2/00; B06B 1/06; B06B 1/00
USPC .................................................... 310/300
See application file for complete search history.

(56) References Cited

U.S. PATENT DOCUMENTS

| | | | |
|---|---|---|---|
| 3,156,759 A | 11/1964 | Collen | |
| 5,907,211 A * | 5/1999 | Hall | H02N 2/043 310/330 |
| 7,508,117 B2 * | 3/2009 | Takeuchi | H10N 30/2046 310/332 |

(Continued)

FOREIGN PATENT DOCUMENTS

| CN | 105975088 A | 9/2016 |
|---|---|---|
| CN | 106026764 A | 10/2016 |

(Continued)

OTHER PUBLICATIONS

International Patent Application No. PCT/CN2021/097904, International Search Report and Written Opinion with Partial English Machine Translation mailed Aug. 13, 2021, 9 pages.

(Continued)

*Primary Examiner* — Burton S Mullins
(74) *Attorney, Agent, or Firm* — Fredrikson & Byron, P.A.

(57) ABSTRACT

The present application provides a motor and an electronic device, where the motor includes a housing, a first electric vibration part, and a mass block; an accommodating cavity is disposed in the housing, the first electric vibration part and the mass block are disposed in the accommodating cavity, a first end of the first electric vibration part is connected to the housing, and a second end of the first electric vibration part is connected to the mass block; and when a voltage is applied to the first electric vibration part, the first electric vibration part drives the mass block to move.

14 Claims, 3 Drawing Sheets

(56) References Cited

U.S. PATENT DOCUMENTS

| | | | | |
|---|---|---|---|---|
| 8,093,784 B2* | 1/2012 | Harigai | ................ | H10N 30/304 |
| | | | | 310/330 |
| 8,421,304 B2* | 4/2013 | Hino | ..................... | H10N 30/87 |
| | | | | 310/330 |
| 10,596,595 B2* | 3/2020 | Hua | ........................ | B06B 1/045 |
| 10,742,104 B2* | 8/2020 | Zhu | ........................ | H02K 33/02 |
| 2009/0261688 A1* | 10/2009 | Xie | .................... | G02B 26/0866 |
| | | | | 310/307 |
| 2011/0050035 A1 | 3/2011 | Wischnewskiy et al. | | |
| 2012/0228996 A1* | 9/2012 | Suzuki | ............... | G02B 26/0833 |
| | | | | 310/323.01 |
| 2018/0297067 A1* | 10/2018 | Huang | .................. | H02K 33/02 |

FOREIGN PATENT DOCUMENTS

| | | | | |
|---|---|---|---|---|
| CN | 205880816 U | | 1/2017 | |
| CN | 106936331 A | | 7/2017 | |
| CN | 108631645 A | | 10/2018 | |
| CN | 208691117 U | | 4/2019 | |
| CN | 110212807 A | | 9/2019 | |
| CN | 110556998 | * | 12/2019 | ............. H02K 33/02 |
| CN | 110556998 A | | 12/2019 | |
| CN | 110601489 A | | 12/2019 | |
| CN | 209881676 U | | 12/2019 | |
| JP | 2002171341 A | | 6/2002 | |
| JP | 2010260043 A | | 11/2010 | |
| JP | 2016051894 A | | 4/2016 | |
| JP | 2019136630 A | | 8/2019 | |
| KR | 1020140076193 A | | 6/2014 | |
| KR | 1020150102876 A | | 9/2015 | |
| WO | 2016157264 A1 | | 10/2016 | |
| WO | 2017168793 | * | 10/2017 | ............. H04R 1/00 |
| WO | 2017168793 A1 | | 10/2017 | |
| WO | 2019044958 A1 | | 3/2019 | |

OTHER PUBLICATIONS

European Patent Office "Extended European Search Report" From Application No. 21816920.9, Dated Nov. 17, 2023, pp. 10.

* cited by examiner

MOTOR AND ELECTRONIC DEVICE

CROSS-REFERENCE TO RELATED APPLICATIONS

The present application is a continuation of International Application No. PCT/CN2021/097904, filed on Jun. 2, 2021, which claims priority to Chinese Patent Application No. 202010499960.2 filed in China on Jun. 4, 2020, which are incorporated herein by reference in their entireties.

TECHNICAL FIELD

The present application relates to the field of electronics, and in particular, to a motor and an electronic device.

BACKGROUND

Currently, electronic devices, such as mobile phones, handheld game consoles, handheld multimedia entertainment devices, or other electronic products usually adopt micro vibration motors to realize vibration feedback.

At present, mainstream motors are implemented in the following principle: when a current-carrying conductor passes through a magnetic field, it will be subject to a force whose direction is perpendicular to directions of a current and the magnetic field, and the magnitude of the force is proportional to the current, a wire length, and magnetic flux density. A motor includes magnetic steel, a mass block, and a coil. When an alternating current is input into the coil, the coil is subject to an alternating driving force, resulting in an alternating motion, which drives the mass block to vibrate for a vibration sound.

Since the motor includes the magnetic steel and the coil, and magnetic fields generated by the magnetic steel and the coil may interfere with devices around the motor.

SUMMARY

According to a first aspect of the present application, a motor is provided, which includes a housing, a first electric vibration part, and a mass block, where
    an accommodating cavity is disposed in the housing, the first electric vibration part and the mass block are disposed in the accommodating cavity, a first end of the first electric vibration part is connected to the housing, and a second end of the first electric vibration part is connected to the mass block; and
    when a voltage is applied to the first electric vibration part, the first electric vibration part drives the mass block to move.

The motor further includes a second electric vibration part, where the housing includes an upper housing and a lower housing;
    the upper housing and the lower housing cooperate to form the accommodating cavity, and the first electric vibration part, the mass block, and the second electric vibration part are disposed in the accommodating cavity;
    the first electric vibration part is disposed on the upper housing, the second electric vibration part is disposed on the lower housing, the mass block is disposed between the first electric vibration part and the second electric vibration part, and the mass block is separately connected to the first electric vibration part and the second electric vibration part; and
    when a voltage is applied to the first electric vibration part and the second electric vibration part, the first electric vibration part and the second electric vibration part drive the mass block to move.

Further, the first electric vibration part includes a first electric vibration plate and a second electric vibration plate that are disposed crosswise;
    a first end of the first electric vibration plate is connected to the upper housing, and a second end of the first electric vibration plate is connected to a first area of the mass block;
    a first end of the second electric vibration plate is connected to the upper housing, and a second end of the second electric vibration plate is connected to a second area of the mass block; and the first area and the second area are located on a first surface of the mass block.

Further, the second electric vibration part includes a third electric vibration plate and a fourth electric vibration plate that are disposed crosswise;
    a first end of the third electric vibration plate is connected to the lower housing, and a second end of the third electric vibration plate is connected to a third area of the mass block;
    a first end of the fourth electric vibration plate is connected to the lower housing, and a second end of the fourth electric vibration plate is connected to a fourth area of the mass block;
    the third area and the fourth area are located on a second surface of the mass block; and
    the first surface of the mass block is opposite to the second surface of the mass block.

Further, polarities of voltages applied to the first surface of the first electric vibration plate, the first surface of the second electric vibration plate, the first surface of the third electric vibration plate, and the first surface of the fourth electric vibration plate are the same, polarities of voltages applied to the second surface of the first electric vibration plate, the second surface of the second electric vibration plate, the second surface of the third electric vibration plate, and the second surface of the fourth electric vibration plate are the same, and the first electric vibration plate, the second electric vibration plate, the third electric vibration plate, and the fourth electric vibration plate drive the mass block to move in the same direction under the action of the voltage polarity of the first surface and the voltage polarity of the second surface respectively.

Further, the first area and the second area are symmetrically distributed based on a center point of the first surface of the mass block; and
    the third area and the fourth area are symmetrically distributed based on a center point of the second surface of the mass block.

Further, the motor further includes a first printed circuit board and a second printed circuit board electrically connected to each other, where the first printed circuit board is disposed on the upper housing, and the second printed circuit board is disposed on the lower housing;
    the first printed circuit board is separately electrically connected to the first surface and the second surface of the first electric vibration plate, and the first printed circuit board is separately electrically connected to the first surface and the second surface of the second electric vibration plate;
    the second printed circuit board is separately electrically connected to the first surface and the second surface of the third electric vibration plate, and the second printed circuit board is separately electrically connected to the first surface and the second surface of the fourth electric vibration plate;

polarities of voltages applied to the first surface of the first electric vibration plate, the first surface of the second electric vibration plate, the first surface of the third electric vibration plate, and the first surface of the fourth electric vibration plate are the same; and polarities of voltages applied to the second surface of the first electric vibration plate, the second surface of the second electric vibration plate, the second surface of the third electric vibration plate, and the second surface of the fourth electric vibration plate are the same, where a first surface and a second surface of each electric vibration plate are distributed opposite to each other.

Further, the motor further includes a first gasket and a second gasket, where the first electric vibration plate is electrically connected to the first printed circuit board on the upper housing through the first gasket; and the second electric vibration plate is electrically connected to the first printed circuit board on the upper housing through the second gasket.

Further, the motor further includes a third gasket and a fourth gasket, where the third electric vibration plate is electrically connected to the second printed circuit board on the lower housing through the third gasket; and the fourth electric vibration plate is electrically connected to the second printed circuit board on the lower housing through the fourth gasket.

Further, the motor further includes a first damping part and a second damping part, where the first damping part is disposed in a fifth area of the upper housing and the second damping part is disposed in a sixth area of the upper housing; and a vertical projection of a boundary line of the first surface of the mass block on the upper housing partially overlaps with the fifth area, and a vertical projection of a boundary line of the first surface of the mass block on the upper housing partially overlaps with the sixth area.

Further, the motor further includes a third damping part and a fourth damping part, where the third damping part is disposed in a seventh area of the lower housing, and the fourth damping part is disposed in an eighth area of the lower housing; and a vertical projection of a boundary line of the second surface of the mass block on the lower housing partially overlaps with the seventh area, and a vertical projection of a boundary line of the second surface of the mass block on the lower housing partially overlaps with the eighth area.

Further, the motor further includes a first bracket and a second bracket, where the first bracket is connected to the first electric vibration plate, and the second bracket is connected to the second electric vibration plate;

the first electric vibration plate is fixedly connected to the first area of the mass block through the first bracket; and the second electric vibration plate is fixedly connected to the second area of the mass block through the second bracket.

Further, both the first electric vibration plate and the second electric vibration plate are ion-conductive vibration plates;

when a voltage applied to the first electric vibration plate and a voltage applied to the second electric vibration plate are both a first voltage, the first electric vibration plate and the second electric vibration plate drive the mass block to move along a first direction; or when a voltage applied to the first electric vibration plate and a voltage applied to the second electric vibration plate are both a second voltage, the first electric vibration plate and the second electric vibration plate drive the mass block to move along a second direction, where a polarity of the first voltage is opposite to that of the second voltage, and the first direction is opposite to the second direction.

Further, when the voltage applied to the first electric vibration plate and the voltage applied to the second electric vibration plate are both a first voltage, the first electric vibration plate and the second electric vibration plate drive the mass block to move for a first distance along the first direction; or when the voltage applied to the first electric vibration plate and the voltage applied to the second electric vibration plate are both a third voltage, the first electric vibration plate and the second electric vibration plate drive the mass block to move for a second distance along the first direction, where polarities of the first voltage and the third voltage are the same, the third voltage is greater than the first voltage, and the first distance is different from the second distance.

Further, when the voltage applied to the first electric vibration plate and the voltage applied to the second electric vibration plate are both a first voltage, the first electric vibration plate and the second electric vibration plate drive the mass block to move along the first direction at a first rate; and when the voltage applied to the first electric vibration plate and the voltage applied to the second electric vibration plate are both a third voltage, the first electric vibration plate and the second electric vibration plate drive the mass block to move along the first direction at a second rate, where polarities of the first voltage and the third voltage are the same, the third voltage is greater than the first voltage, and the first rate is different from the second rate.

Further, the first electric vibration plate, the second electric vibration plate, the third electric vibration plate, and the fourth electric vibration plate are all ion-conductive vibration plates, the ion-conductive vibration plate includes a first electrode layer, an ion exchange resin layer, and a second electrode layer stacked in sequence, and the ion exchange resin layer is provided with polymer electrolyte.

According to a second aspect of the present application, an electronic device is provided, which includes the motor described in the first aspect.

DESCRIPTION OF EMBODIMENTS

The following clearly describes the technical solutions in the embodiments of the present application with reference to the accompanying drawings in the embodiments of the present application. Apparently, the described embodiments are some rather than all of the embodiments of the present application. Based on the embodiments of the present application, all other embodiments obtained by a person of ordinary skill in the art without creative efforts fall within the protection scope of the present application.

Figure 1:
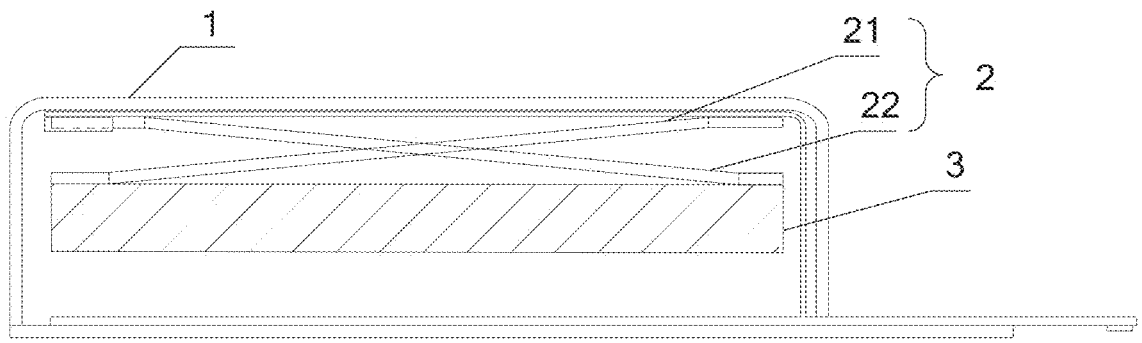
FIG. 1 is a first schematic structural diagram of a motor according to an embodiment of the present application.

Referring to FIG. 1, this embodiment provides a motor, including a housing 1, a first electric vibration part 2, and a mass block 3; an accommodating cavity is disposed in the housing 1, the first electric vibration part 2 and the mass block 3 are disposed in the accommodating cavity, a first end of the first electric vibration part 2 is connected to the housing 1, and a second end of the first electric vibration part 2 is connected to the mass block; and when a voltage is applied to the first electric vibration part 2, the first electric vibration part 2 drives the mass block 3 to move.

The mass block 3 may be a metal block, such as a tungsten alloy block, or a non-metallic block including non-metallic materials with high density. When a voltage is applied to the first electric vibration part 2, the first electric vibration part 2 drives the mass block 3 to move. By applying a voltage with an alternating polarity to the first electric vibration part 2, the first electric vibration part 2 can drive the mass block 3 to reciprocate, thus generating a sense of vibration.

In FIG. 1, the first electric vibration part 2 is disposed between the mass block 3 and the top of the housing 1, and the first electric vibration part 2 may also be disposed between the mass block 3 and the bottom of the housing 1.

Since no magnetic steel or coil is provided in a structure of the motor, no magnetic field interference will be generated to circuits and devices around the motor, which purifies an operating environment for the circuits and devices around the motor. In addition, the motor in this embodiment has a simple structure, which is convenient for assembly and automatic production, and the motor occupies a relatively small space, so as to better meet the requirement for thinning the electronic device.

Figure 2:
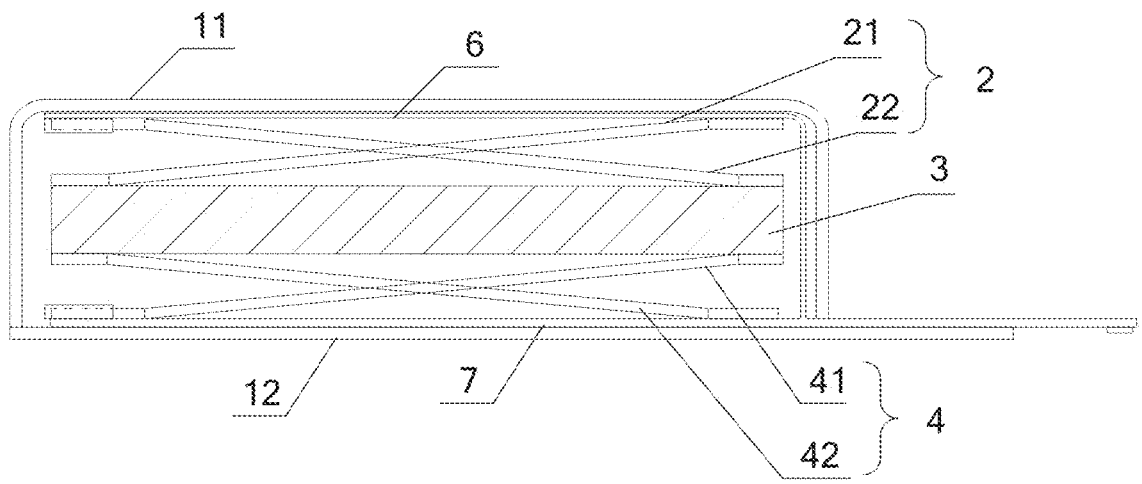
FIG. 2 is a second schematic structural diagram of a motor according to an embodiment of the present application.

As shown in FIG. 2, in an embodiment of the present application, the motor further includes a second electric vibration part 4, where the housing 1 includes an upper housing 11 and a lower housing 12;
   the upper housing 11 and the lower housing 12 cooperate to form the accommodating cavity, and the first electric vibration part 2, the mass block 3, and the second electric vibration part 4 are disposed in the accommodating cavity;
   the first electric vibration part 2 is disposed on the upper housing 11, the second electric vibration part 4 is disposed on the lower housing 12, the mass block 3 is disposed between the first electric vibration part 2 and the second electric vibration part 4, and the mass block 3 is separately connected to the first electric vibration part 2 and the second electric vibration part 4; and
   when a voltage is separately applied to the first electric vibration part 2 and the second electric vibration part 4, the first electric vibration part 2 and the second electric vibration part 4 drive the mass block 3 to move.

Polarities of voltages applied to the first electric vibration part 2 and the second electric vibration part 4 may be the same, so that directions of forces respectively applied by the first electric vibration part 2 and the second electric vibration part 4 to the mass block 3 are the same. By applying voltages with alternating polarities to the first electric vibration part 2 and the second electric vibration part 4 respectively, the first electric vibration part 2 and the second electric vibration part 4 drive the mass block 3 to reciprocate, thus generating a sense of vibration.

As shown in FIG. 2, in an embodiment of the present application, the first electric vibration part 2 includes a first electric vibration plate 21 and a second electric vibration plate 22 that are disposed crosswise;
   a first end of the first electric vibration plate 21 is connected to the upper housing 11, and a second end of the first electric vibration plate 21 is connected to a first area of the mass block 3;
   a first end of the second electric vibration plate 22 is connected to the upper housing 11, and a second end of the second electric vibration plate 22 is connected to a second area of the mass block 3; and
   the first area and the second area are located on a first surface of the mass block 3.

Alternatively, the first end of the first electric vibration plate 21 may be fixedly or detachably connected to the upper housing 11, and the second end of the first electric vibration plate 21 may be connected to the first area of the mass block 3 by welding or gluing.

The first end of the second electric vibration plate 22 may be fixedly or detachably connected to the upper housing 11, and the second end of the second electric vibration plate 22 may be connected to the second area of the mass block 3 by welding or gluing. The first area and the second area are symmetrically distributed based on a center point of the first surface of the mass block 3.

As shown in FIG. 2, in an embodiment of the present application, the second electric vibration part 4 includes a third electric vibration plate 41 and a fourth electric vibration plate 42 that are disposed crosswise;
   a first end of the third electric vibration plate 41 is connected to the lower housing 12, and a second end of the third electric vibration plate 41 is connected to a third area of the mass block 3;
   a first end of the fourth electric vibration plate 42 is connected to the lower housing 12, and a second end of the fourth electric vibration plate 42 is connected to a fourth area of the mass block 3;
   the third area and the fourth area are located on a second surface of the mass block 3; and
   the first surface of the mass block 3 is opposite to the second surface of the mass block 3.

The third area and the fourth area are symmetrically distributed based on a center point of the second surface of the mass block 3.

The first end of the third electric vibration plate 41 may be fixedly or detachably connected to the lower housing 12, and the second end of the third electric vibration plate 41 may be connected to the first area of the mass block 3 by welding or gluing.

The first end of the fourth electric vibration plate 42 may be fixedly or detachably connected to the lower housing 12, and the second end of the fourth electric vibration plate 42 may be connected to the second area of the mass block 3 by welding or gluing. The third area and the fourth area are symmetrically distributed based on a center point of the second surface of the mass block 3. Further, a vertical projection of the first area on the second surface overlaps with the third area, and a vertical projection of the second area on the second surface overlaps with the fourth area.

As shown in FIG. 2, in an embodiment of the present application, the motor further includes a first printed circuit board 6 and a second printed circuit board 7 electrically connected to each other, where the first printed circuit board 6 is disposed on the upper housing 11, and the second printed circuit board 7 is disposed on the lower housing 12;

the first printed circuit board 6 is separately electrically connected to the first surface and the second surface of the first electric vibration plate 21, and the first printed circuit board 6 is separately electrically connected to the first surface and the second surface of the second electric vibration plate 22;

the second printed circuit board 7 is separately electrically connected to the first surface and the second surface of the third electric vibration plate 41, and the second printed circuit board 7 is separately electrically connected to the first surface and the second surface of the fourth electric vibration plate 42;

polarities of voltages applied to the first surface of the first electric vibration plate 21, the first surface of the second electric vibration plate 22, the first surface of the third electric vibration plate 41, and the first surface of the fourth electric vibration plate 42 are the same; and polarities of voltages applied to the second surface of the first electric vibration plate 21, the second surface of the second electric vibration plate 22, the second surface of the third electric vibration plate 41, and the second surface of the fourth electric vibration plate 42 are the same, where a first surface and a second surface of each electric vibration plate are distributed opposite to each other.

Both the first printed circuit board 6 and the second printed circuit board 7 may be flexible printed circuits (Flexible Printed Circuit, FPC), and the first printed circuit board 6 is electrically connected to the second printed circuit board 7. The first printed circuit board 6 is disposed on the upper housing 11, and the second printed circuit board 7 is disposed on the lower housing 12. The first printed circuit board 6 may be fixed on the upper housing 11 by using the double-sided tape, and likewise, the second printed circuit board 7 may be fixed on the lower housing 12 by using the double-sided tape. Further, the second printed circuit board 7 is partially located outside the accommodating cavity.

The first printed circuit board 6 is separately electrically connected to the first surface and the second surface of the first electric vibration plate 21, so as to apply a voltage to the first surface and the second surface of the first electric vibration plate 21, so that the first electric vibration plate 21 is deformed to obtain a driving force for driving the mass block 3 to move; and the first printed circuit board 6 is separately electrically connected to the first surface and the second surface of the second electric vibration plate 22, so that the second electric vibration plate 22 is deformed to obtain a driving force for driving the mass block 3 to move.

The second printed circuit board 7 is separately electrically connected to the first surface and the second surface of the third electric vibration plate 41, so as to apply a voltage to the first surface and the second surface of the third electric vibration plate 41, so that the third electric vibration plate 41 is deformed to obtain a driving force for driving the mass block 3 to move; and the second printed circuit board 7 is separately electrically connected to the first surface and the second surface of the fourth electric vibration plate 42, so that the fourth electric vibration plate 42 is deformed to obtain a driving force for driving the mass block 3 to move.

Polarities of voltages applied to the first surface of the first electric vibration plate 21, the first surface of the second electric vibration plate 22, the first surface of the third electric vibration plate 41, and the first surface of the fourth electric vibration plate 42 are the same, polarities of voltages applied to the second surface of the first electric vibration plate 21, the second surface of the second electric vibration plate 22, the second surface of the third electric vibration plate 41, and the second surface of the fourth electric vibration plate 42 are the same. In this way, deformation directions of the first electric vibration plate 21, the second electric vibration plate 22, the third electric vibration plate 41, and the fourth electric vibration plate 42 are the same, so that directions of the generated driving forces are the same. The first electric vibration plate 21, the second electric vibration plate 22, the third electric vibration plate 41, and the fourth electric vibration plate 42 drive the mass block 3 to move along a same direction.

That the first electric vibration plate 21, the second electric vibration plate 22, the third electric vibration plate 41, and the fourth electric vibration plate 42 drive the mass block 3 to move in the same direction under the action of the voltage polarity of the first surface and the voltage polarity of the second surface respectively refers to that deformation directions of the first electric vibration plate 21, the second electric vibration plate 22, the third electric vibration plate 41, and the fourth electric vibration plate 42 under the action of the voltage polarity of the first surface and the voltage polarity of the second surface are the same. Therefore, the directions of the generated driving forces are the same, and the first electric vibration plate 21, the second electric vibration plate 22, the third electric vibration plate 41, and the fourth electric vibration plate 42 drive the mass block 3 to move along the same direction.

Figure 3:
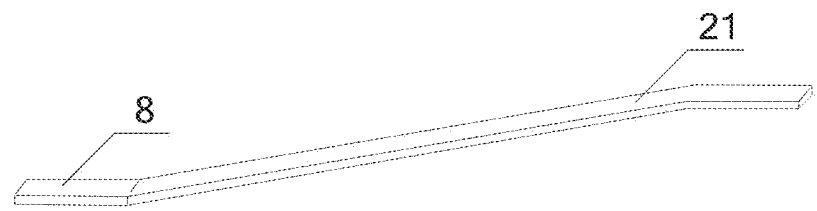
FIG. 3 is a schematic diagram of a partial structure of a motor according to an embodiment of the present application.

As shown in FIG. 3, in an embodiment of the present application, the motor further includes a first gasket 8 and a second gasket 9, where the first electric vibration plate 21 is electrically connected to the first printed circuit board 6 on the upper housing 11 through the first gasket 8; and likewise, the second electric vibration plate 22 is electrically connected to the first printed circuit board 6 on the upper housing 11 through the second gasket 9.

The first gasket 8 is connected to the first end of the first electric vibration plate 21 by welding or gluing. The first gasket 8 may include a first upper gasket and a first lower gasket, and the first upper gasket and the first lower gasket are respectively in contact with the first surface and the second surface of the first electric vibration plate 21. When the first gasket 8 is electrically connected to the first printed circuit board 6, polarities of voltages applied to the first upper gasket and the first lower gasket are opposite, so that polarities of voltages applied to the first surface and the second surface of the first electric vibration plate 21 are opposite. As a result, the first electric vibration plate 21 is deformed and drives the mass block 3 to move.

Likewise, the second gasket 9 is connected to the first end of the second electric vibration plate 22 by welding or gluing. The second gasket 9 may include a second upper gasket and a second lower gasket, and the second upper gasket and the second lower gasket are respectively in contact with the first surface and the second surface of the second electric vibration plate 22. When the second gasket 9 is electrically connected to the first printed circuit board 6, polarities of voltages applied to the second upper gasket and the second lower gasket are opposite, so that polarities of voltages applied to the first surface and the second surface of the second electric vibration plate 22 are opposite. As a result, the second electric vibration plate 22 is deformed and drives the mass block 3 to move.

Further, the motor further includes a third gasket and a fourth gasket, where the third electric vibration plate 41 is electrically connected to the second printed circuit board 7 on the lower housing 12 through the third gasket; and the fourth electric vibration plate 42 is electrically connected to the second printed circuit board 7 on the lower housing 12 through the fourth gasket.

The third gasket is connected to the first end of the third electric vibration plate 41 by welding or gluing. The third gasket may include a third upper gasket and a third lower gasket, and the third upper gasket and the third lower gasket are respectively in contact with the first surface and the second surface of the third electric vibration plate 41. When the third gasket is electrically connected to the second printed circuit board 7, polarities of voltages applied to the third upper gasket and the third lower gasket are opposite, so that polarities of voltages applied to the first surface and the second surface of the third electric vibration plate 41 are opposite. As a result, the third electric vibration plate 41 is deformed and drives the mass block 3 to move.

Likewise, the fourth gasket is connected to the first end of the fourth electric vibration plate 42 by welding or gluing. The fourth gasket may include a fourth upper gasket and a fourth lower gasket, and the fourth upper gasket and the fourth lower gasket are respectively in contact with the first surface and the second surface of the fourth electric vibration plate 42. When the fourth gasket is electrically connected to the second printed circuit board 7, polarities of voltages applied to the fourth upper gasket and the fourth lower gasket are opposite, so that polarities of voltages applied to the first surface and the second surface of the fourth electric vibration plate 42 are opposite. As a result, the fourth electric vibration plate 42 is deformed and drives the mass block 3 to move.

Figure 4:
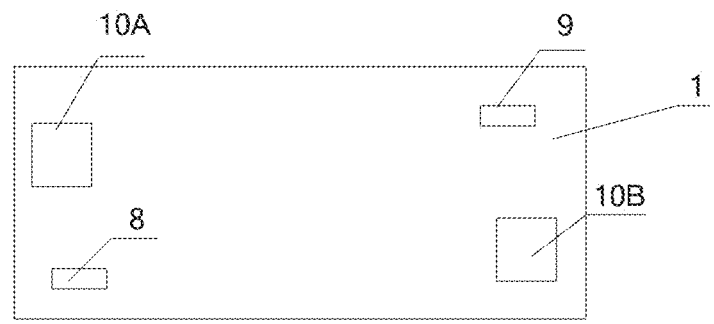
FIG. 4 is a bottom view of an upper housing according to an embodiment of the present application.

As shown in FIG. 4, in an embodiment of the present application, the motor further includes a first damping part 10A and a second damping part 10B, where the first damping part 10A is disposed in a fifth area of the upper housing 11, and the second damping part 10B is disposed in a sixth area of the upper housing 11; and a vertical projection of a boundary line of the first surface of the mass block 3 on the upper housing 11 partially overlaps with the fifth area, and a vertical projection of a boundary line of the first surface of the mass block 3 on the upper housing 11 partially overlaps with the sixth area. In this way, when the mass block 3 moves toward the upper housing 11, the first damping part 10A and the second damping part 10B may play an anti-collision role, to prevent the mass block from hitting the upper housing 11, which may cause the motor to be damaged. In addition, the noise caused by the mass block hitting the upper housing 11 can be reduced.

Likewise, the motor further includes a third damping part and a fourth damping part, where the third damping part is disposed in a seventh area of the lower housing 12, and the fourth damping part is disposed in an eighth area of the lower housing 12; and a vertical projection of a boundary line of the second surface of the mass block 3 on the lower housing 12 partially overlaps with the seventh area, and a vertical projection of a boundary line of the second surface of the mass block 3 on the lower housing 12 partially overlaps with the eighth area. In this way, when the mass block 3 moves toward the lower housing 12, the third damping part and the fourth damping part may play an anti-collision role, to prevent the mass block from hitting the lower housing 12, which may cause the motor to be damaged. In addition, the noise caused by the mass block hitting the lower housing 12 can be reduced.

The first damping part 10A may be made of damping foam, and the dynamic characteristics of the damping foam change little with temperature, which may ensure the stable operation of the motor under high and low temperatures and little change of a sense of vibration, thus avoiding the noise generated by the mass block 3 hitting the upper housing 11 and the lower housing 12 due to excessive displacement. The second damping part, the third damping part, and the fourth damping part may also be made of the damping foam.

In an embodiment of the present application, the motor further includes a first bracket and a second bracket, where the first bracket is connected to the first electric vibration plate 21, and the second bracket is connected to the second electric vibration plate 22; and the first electric vibration plate 21 is fixedly connected to the first area of the mass block 3 through the first bracket; and the second electric vibration plate 22 is fixedly connected to the second area of the mass block 3 through the second bracket.

That is, the first bracket is separately connected to the second end of the first electric vibration plate 21 and the first area of the mass block 3; and the second bracket is separately connected to the second end of the second electric vibration plate 22 and the second area of the mass block 3. The first bracket and the second bracket may be made of low-cost insulating materials, so as to save the amount of the electric vibration plate and reduce the cost of the motor.

In an embodiment of the present application, both the first electric vibration plate 21 and the second electric vibration plate 22 are ion-conductive vibration plates;

when the voltage applied to the first electric vibration plate 21 and the voltage applied to the second electric vibration plate 22 are both a first voltage, the first electric vibration plate 21 and the second electric vibration plate 22 drive the mass block 3 to move along the first direction; and when the voltage applied to the first electric vibration plate 21 and the voltage applied to the second electric vibration plate 22 are both a second voltage, the first electric vibration plate 21 and the second electric vibration plate 22 drive the mass block 3 to move along the second direction, where a polarity of the first voltage is opposite to that of the second voltage, and the first direction is opposite to the second direction. That is, the first direction and the second direction are opposite to each other. Voltages with opposite polarities are applied to the ion-conductive vibration plate alternatively, so that the ion-conductive vibration plate drives the mass block 3 to move alternately along the first direction and the second direction, thus generating a sense of vibration.

Further, when the voltage applied to the first electric vibration plate 21 and the voltage applied to the second electric vibration plate 22 are both a first voltage, the first electric vibration plate 21 and the second electric vibration plate 22 drive the mass block 3 to move for a first distance along the first direction; or when the voltage applied to the first electric vibration plate 21 and the voltage applied to the second electric vibration plate 22 are both a third voltage, the first electric vibration plate 21 and the second electric vibration plate 22 drive the mass block 3 to move for a second distance along the first direction, where polarities of the first voltage and the third voltage are the same, the third voltage is greater than the first voltage, and the first distance is different from the second distance. For example, the second distance may be greater than the first distance. When it is required that the mass block 3 moves for a relatively long distance, the mass block 3 may be driven, by applying a relatively great voltage to the ion-conductive vibration plate, to move for the relatively long distance; and when it is required that the mass block 3 moves for a relatively short distance, the mass block 3 may be driven, by applying a relatively small voltage to the ion-conductive vibration plate, to move for the relatively short distance. There is a correspondence between the magnitude of the voltage applied to the ion-conductive vibration plate and a movement distance of the mass block 3. In a case that the distance for which the mass block 3 is required to move is determined, the magnitude of the voltage applied to the ion-conductive vibration plate may be determined based on the correspondence.

Figure 5:
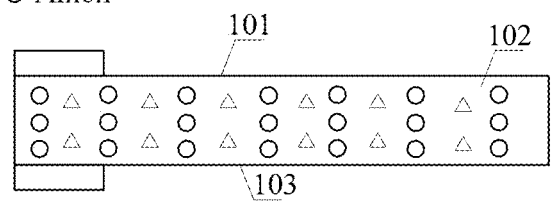
FIG. 5 is a schematic structural diagram of an ion-conductive vibration plate according to an embodiment of the present application.
Figure 6:
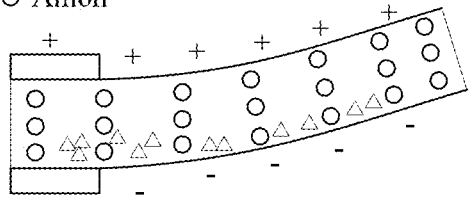
FIG. 6 and FIG. 7 are schematic diagrams of deformation of an ion-conductive vibration plate according to an embodiment of the present application.
Figure 7:
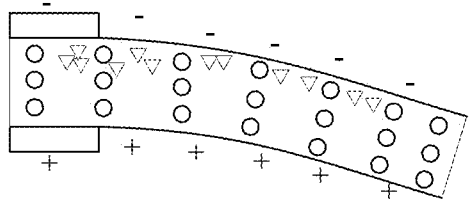

As shown in FIG. 5, the ion-conductive vibration plate includes a first electrode layer 101, an ion exchange resin layer 102, and a second electrode layer 103 stacked in sequence, and the ion exchange resin layer 102 is provided with polymer electrolyte. The ion-conductive vibration plate may be made of an ion-exchange polymer metal composite (ion-exchange polymer metal composite, IPMC). The IPMC is a new electrically actuated functional material, which takes the ion exchange resin layer (such as the fluorocarbon polymer) as a substrate, and precious metals (such as platinum and silver) are plated on the surface of the substrate to form an electrode layer, namely, the first electrode layer 101 and the second electrode layer 103. The ion exchange resin layer 102 includes the polymer electrolyte, which includes cations and anions. Positions and numbers of the cations and anions in FIG. 5 are only for illustration and do not represent the actual situation. As shown in FIG. 6 and FIG. 7, when a voltage is applied to the IPMC in a thickness direction, hydrated cations in the polymer electrolyte may move to a cathode side, causing a swelling difference between the anode surface and the cathode surface of the IPMC, so that the IPMC is deformed and bends towards the anode surface. In this way, a bending degree of the IPMC may be controlled by controlling the voltage or current of the IPMC, so that the IPMC generates displacement in the lateral direction.

The IPMC is a new driving material with the advantages of light driving mass, large displacement and deformation, low driving voltage, and the like. The advantages of adopting the IPMC are obvious. For example, the IPMC is a non-magnetic material and may not produce magnetic interference; and the displacement and velocity caused by IPMC deformation decrease in proportion to the thickness of the IPMC, while the force caused by IPMC deformation increases in proportion to the cube of the thickness of the IPMC. Therefore, the thickness of the IPMC may be set based on the actual situation to obtain the required displacement, velocity, and force generated by IPMC deformation.

By applying a voltage to the ion-conductive vibration plate, cations in the polymer electrolyte move to a cathode side, causing a swelling difference between the front and the back of the ion-conductive vibration plate. This difference may cause the ion-conductive vibration plate to deform, and alternately change a direction of the voltage applied to the ion-conductive vibration plate, so that a deformation direction of the ion-conductive vibration plate changes alternately, thereby driving the mass block 3 to move alternately and generating a sense of vibration. A vibration amplitude can be from 0.1 mm to 10 mm, and the vibration amplitude can be controlled by setting the thickness of the ion-conductive vibration plate and adjusting the magnitude of a current passing through the ion-conductive vibration plate.

FIG. 6 is a schematic diagram of distribution of cations in the ion-conductive vibration plate when a forward current passes through the ion-conductive vibration plate. Cations move to a cathode side of the ion-conductive vibration plate, the ion-conductive vibration plate moves upward and drives the mass block 3 to move upward, and a direction shown by an arrow in FIG. 6 is a movement direction of the ion-conductive vibration plate.

FIG. 7 is a schematic diagram of distribution of cations in the ion-conductive vibration plate when a reverse current passes through the ion-conductive vibration plate. Cations move to a cathode side of the ion-conductive vibration plate, the ion-conductive vibration plate moves downward and drives the mass block 3 to move downward, and a direction shown by an arrow in FIG. 7 is a movement direction of the ion-conductive vibration plate. By application of a voltage to an ion-conductive vibration plate, cations in polymer electrolyte of the ion-conductive vibration plate move to the cathode side, causing a difference in swelling between the front and the back of the ion-conductive vibration plate and then causing the ion-conductive vibration plate to deform. When an alternating current is applied to the ion-conductive vibration plate, the ion-conductive vibration plate may drive the mass block 3 to vibrate reciprocally, thus generating a sense of vibration.

Further, when the voltage applied to the first electric vibration plate 21 and the voltage applied to the second electric vibration plate 22 are both a first voltage, the first electric vibration plate 21 and the second electric vibration plate 22 drive the mass block 3 to move along the first direction at a first rate; and when the voltage applied to the first electric vibration plate 21 and the voltage applied to the second electric vibration plate 22 are both a third voltage, the first electric vibration plate 21 and the second electric vibration plate 22 drive the mass block 3 to move along the first direction at a second rate, where polarities of the first voltage and the third voltage are the same, the third voltage is greater than the first voltage, and the first rate is different from the second rate. For example, the second rate may be less than the first rate. When it is required that the mass block 3 moves at a relatively high rate, the mass block 3 may be driven, by applying a relatively great voltage to the ion-conductive vibration plate, to move at the relatively high rate; and when it is required that the mass block 3 moves at a relatively low rate, the mass block 3 may be driven, by applying a relatively small voltage to the ion-conductive vibration plate, to move at the relatively low rate. There is a correspondence between the magnitude of the voltage applied to the ion-conductive vibration plate and a movement rate of the mass block 3. In a case that the rate at which the mass block 3 is required to move is determined, the magnitude of the voltage applied to the ion-conductive vibration plate may be determined based on the correspondence.

Further, the first electric vibration plate 21, the second electric vibration plate 22, the third electric vibration plate 41, and the fourth electric vibration plate 42 are all ion-conductive vibration plates, the ion-conductive vibration plate includes a first electrode layer, an ion exchange resin layer, and a second electrode layer stacked in sequence, and the ion exchange resin layer is provided with polymer electrolyte. Directions of forces acting on the mass block 3 by the first electric vibration plate 21, the second electric vibration plate 22, the third electric vibration plate 41, and the fourth electric vibration plate 42 are the same, for example, the direction is the first direction or the second direction, and this joint force drives the mass block 3 to move.

Figure 8:
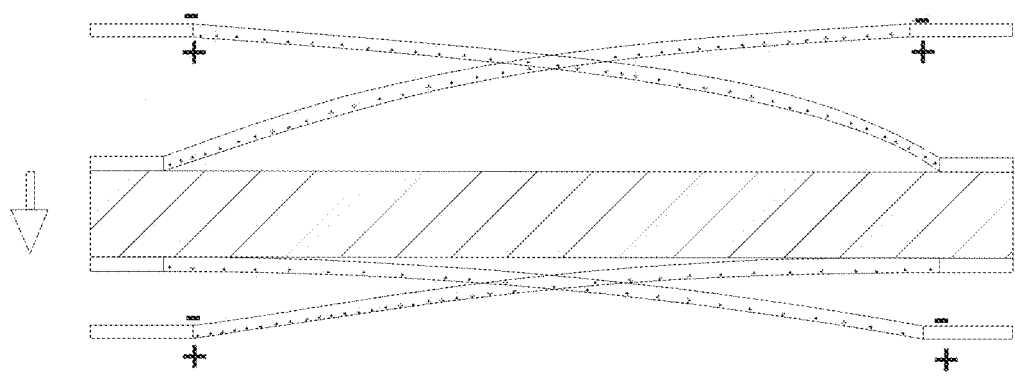
FIG. 8 and FIG. 9 are schematic diagrams of movement of a mass block according to an embodiment of the present application.
Figure 9:
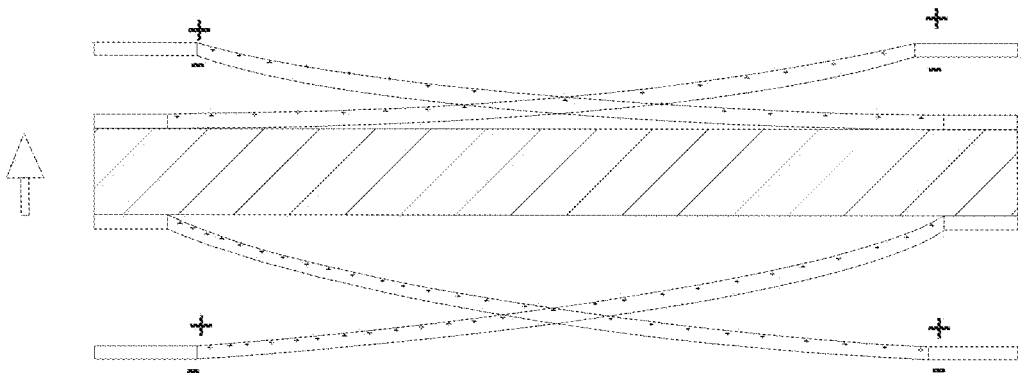

In FIG. 8, the first electric vibration plate 21, the second electric vibration plate 22, the third electric vibration plate 41, and the fourth electric vibration plate 42 drive the mass block 3 to move toward the first direction, and a movement direction is shown by an arrow in FIG. 8. In FIG. 9, the first electric vibration plate 21, the second electric vibration plate 22, the third electric vibration plate 41, and the fourth electric vibration plate 42 drive the mass block 3 to move toward the second direction, and a movement direction is shown by an arrow in FIG. 9.

An embodiment of the present application further provides an electronic device, including the motor according to any one of the foregoing embodiments.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A motor, comprising a housing, a first electric vibration part, and a mass block, wherein an accommodating cavity is disposed in the housing, the first electric vibration part and the mass block are disposed in the accommodating cavity, a first end of the first electric vibration part is connected to the housing, and a second end of the first electric vibration part is connected to the mass block; and
   when a voltage is applied to the first electric vibration part, the first electric vibration part drives the mass block to move;
   the motor further comprises a second electric vibration part, wherein the housing comprises an upper housing and a lower housing; the first electric vibration part comprises a first electric vibration plate and a second electric vibration plate that are disposed crosswise; the second electric vibration part comprises a third electric vibration plate and a fourth electric vibration plate that are disposed crosswise;
   wherein the motor further comprises a first printed circuit board and a second printed circuit board electrically connected to each other, wherein the first printed circuit board is disposed on the upper housing, and the second printed circuit board is disposed on the lower housing;
   the first printed circuit board is separately electrically connected to the first surface and the second surface of the first electric vibration plate, and the first printed circuit board is separately electrically connected to the first surface and the second surface of the second electric vibration plate;
   the second printed circuit board is separately electrically connected to the first surface and the second surface of the third electric vibration plate, and the second printed circuit board is separately electrically connected to the first surface and the second surface of the fourth electric vibration plate;
   polarities of voltages applied to the first surface of the first electric vibration plate, the first surface of the second electric vibration plate, the first surface of the third electric vibration plate, and first surface of the fourth electric vibration plate are the same; and
   polarities of voltages applied to the second surface of the first electric vibration plate, the second surface of the second electric vibration plate, the second surface of the third electric vibration plate, and the second surface of the fourth electric vibration plate are the same, wherein
   a first surface and a second surface of each electric vibration plate are distributed opposite to each other.

2. The motor according to claim 1,
   wherein the upper housing and the lower housing cooperate to form the accommodating cavity, and the first electric vibration part, the mass block, and the second electric vibration part are disposed in the accommodating cavity;
   the first electric vibration part is disposed on the upper housing, the second electric vibration part is disposed on the lower housing, the mass block is disposed between the first electric vibration part and the second electric vibration part, and the mass block is separately connected to the first electric vibration part and the second electric vibration part; and
   when a voltage is applied to the first electric vibration part and the second electric vibration part, the first electric vibration part and the second electric vibration part drive the mass block to move.

3. The motor according to claim 1, wherein
   a first end of the first electric vibration plate is connected to the upper housing, and a second end of the first electric vibration plate is connected to a first area of the mass block;
   a first end of the second electric vibration plate is connected to the upper housing, and a second end of the second electric vibration plate is connected to a second area of the mass block; and
   the first area and the second area are located on a first surface of the mass block.

4. The motor according to claim 3, wherein both the first electric vibration plate and the second electric vibration plate are ion-conductive vibration plates;
   when a voltage applied to the first electric vibration plate and a voltage applied to the second electric vibration plate are both a first voltage, the first electric vibration plate and the second electric vibration plate drive the mass block to move along a first direction; or
   when a voltage applied to the first electric vibration plate and a voltage applied to the second electric vibration plate are both a second voltage, the first electric vibration plate and the second electric vibration plate drive the mass block to move along a second direction, wherein
   a polarity of the first voltage is opposite to that of the second voltage, and the first direction is opposite to the second direction.

5. The motor according to claim 4, wherein when the voltage applied to the first electric vibration plate and the voltage applied to the second electric vibration plate are both the first voltage, the first electric vibration plate and the second electric vibration plate drive the mass block to move for a first distance along the first direction; or when the voltage applied to the first electric vibration plate and the voltage applied to the second electric vibration plate are both a third voltage, the first electric vibration plate and the second electric vibration plate drive the mass block to move for a second distance along the first direction, wherein polarities of the first voltage and the third voltage are the same, the third voltage is greater than the first voltage, and the first distance is different from the second distance.

6. The motor according to claim 4, wherein when the voltage applied to the first electric vibration plate and the voltage applied to the second electric vibration plate are both the first voltage, the first electric vibration plate and the second electric vibration plate drive the mass block to move along the first direction at a first rate; or when the voltage applied to the first electric vibration plate and the voltage applied to the second electric vibration plate are both a third voltage, the first electric vibration plate and the second electric vibration plate drive the mass block to move along the first direction at a second rate, wherein polarities of the first voltage and the third voltage are the same, the third voltage is greater than the first voltage, and the first rate is different from the second rate.

7. The motor according to claim 3, further comprising a first damping part and a second damping part, wherein the first damping part is disposed in a fifth area of the upper housing and the second damping part is disposed in a sixth area of the upper housing; and a vertical projection of a boundary line of the first surface of the mass block on the upper housing partially overlaps with the fifth area, and a vertical projection of a boundary line of the first surface of the mass block on the upper housing partially overlaps with the sixth area.

8. The motor according to claim 7, further comprising a third damping part and a fourth damping part, wherein the third damping part is disposed in a seventh area of the lower housing, and the fourth damping part is disposed in an eighth area of the lower housing; and a vertical projection of a boundary line of the second surface of the mass block on the lower housing partially overlaps with the seventh area, and a vertical projection of a boundary line of the second surface of the mass block on the lower housing partially overlaps with the eighth area.

9. The motor according to claim 1, wherein
a first end of the third electric vibration plate is connected to the lower housing, and a second end of the third electric vibration plate is connected to a third area of the mass block;

a first end of the fourth electric vibration plate is connected to the lower housing, and a second end of the fourth electric vibration plate is connected to a fourth area of the mass block;

the third area and the fourth area are located on a second surface of the mass block; and the first surface of the mass block is opposite to the second surface of the mass block.

10. The motor according to claim 9, wherein the first electric vibration plate, the second electric vibration plate, the third electric vibration plate, and the fourth electric vibration plate are all ion-conductive vibration plates, the ion-conductive vibration plate comprises a first electrode layer, an ion exchange resin layer, and a second electrode layer stacked in sequence, and the ion exchange resin layer is provided with polymer electrolyte.

11. The motor according to claim 9, wherein polarities of voltages applied to the first surface of the first electric vibration plate, the first surface of the second electric vibration plate, the first surface of the third electric vibration plate, and the first surface of the fourth electric vibration plate are the same, polarities of voltages applied to the second surface of the first electric vibration plate, the second surface of the second electric vibration plate, the second surface of the third electric vibration plate, and the second surface of the fourth electric vibration plate are the same, the first electric vibration plate, the second electric vibration plate, the third electric vibration plate, and the fourth electric vibration plate drive the mass block to move in the same direction under the action of the voltage polarity of the first surface and the voltage polarity of the second surface respectively.

12. The motor according to claim 9, wherein the first area and the second area are symmetrically distributed based on a center point of the first surface of the mass block; and the third area and the fourth area are symmetrically distributed based on a center point of the second surface of the mass block.

13. The motor according to claim 1, further comprising a first gasket and a second gasket, wherein the first electric vibration plate is electrically connected to the first printed circuit board on the upper housing through the first gasket; and the second electric vibration plate is electrically connected to the first printed circuit board on the upper housing through the second gasket.

14. The motor according to claim 13, further comprising a third gasket and a fourth gasket, wherein the third electric vibration plate is electrically connected to the second printed circuit board on the lower housing through the third gasket; and the fourth electric vibration plate is electrically connected to the second printed circuit board on the lower housing through the fourth gasket.

* * * * *